United States Patent
Chen

(10) Patent No.: US 9,916,786 B2
(45) Date of Patent: Mar. 13, 2018

(54) DISPLAY DRIVING METHOD, DRIVING CIRCUIT AND DISPLAY DEVICE

(71) Applicant: BOE TECHNOLOGY GROUP CO., LTD., Beijing (CN)

(72) Inventor: Ruisi Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 66 days.

(21) Appl. No.: 14/913,564

(22) PCT Filed: Aug. 31, 2015

(86) PCT No.: PCT/CN2015/088558
§ 371 (c)(1),
(2) Date: Feb. 22, 2016

(87) PCT Pub. No.: WO2016/161754
PCT Pub. Date: Oct. 13, 2016

(65) Prior Publication Data
US 2017/0039922 A1    Feb. 9, 2017

(30) Foreign Application Priority Data
Apr. 9, 2015    (CN) .......................... 2015 1 0166719

(51) Int. Cl.
G09G 5/10    (2006.01)
G09G 3/20    (2006.01)
G09G 5/02    (2006.01)

(52) U.S. Cl.
CPC ............. *G09G 3/2003* (2013.01); *G09G 5/02* (2013.01); *G06T 2207/10024* (2013.01);
(Continued)

(58) Field of Classification Search
CPC .... G09G 3/2003; G09G 5/02; G09G 2340/06; G09G 2354/00; G09G 2340/14; G06T 2207/10024
(Continued)

(56) References Cited

U.S. PATENT DOCUMENTS

2004/0212815 A1    10/2004    Heeman et al.
2005/0105796 A1    5/2005    Hong et al.
(Continued)

FOREIGN PATENT DOCUMENTS

CN    1951101 A    4/2007
CN    101034542 A    9/2007
(Continued)

OTHER PUBLICATIONS

International Search Report and Written Opinion in PCT International Application No. PCT/CN2015/088558, dated Jan. 18, 2016.
(Continued)

*Primary Examiner* — Srilakshmi K Kumar
*Assistant Examiner* — Chineyere Wills-Burns
(74) *Attorney, Agent, or Firm* — Brooks Kushman P.C.

(57) ABSTRACT

The present disclosure provides a method for driving a display, including: step 1, obtaining a tone of each sub-pixels in an input image; step 2, determining whether a color of each sub-pixel to be calculated in the input image is capable of being distinguished from a reference color by a two-color blind viewer; and step 3, calculating the tone of each sub-pixel in an output image based on a result of the determination in step 2.

21 Claims, 1 Drawing Sheet

(52) U.S. Cl.
CPC ..... *G09G 2340/06* (2013.01); *G09G 2340/14* (2013.01); *G09G 2354/00* (2013.01)

(58) Field of Classification Search
USPC .......................................................... 345/690
See application file for complete search history.

(56) References Cited

U.S. PATENT DOCUMENTS

| | | | | |
|---|---|---|---|---|
| 2006/0279786 | A1* | 12/2006 | Park | G09G 3/3688 358/2.1 |
| 2006/0284872 | A1 | 12/2006 | Brown Elliott | |
| 2007/0171308 | A1 | 7/2007 | Hsuan et al. | |
| 2010/0231603 | A1* | 9/2010 | Kang | G09G 3/3426 345/591 |
| 2014/0043357 | A1* | 2/2014 | Yamato | G09G 3/3607 345/603 |
| 2015/0302789 | A1* | 10/2015 | Furihata | G09G 3/2007 345/694 |

FOREIGN PATENT DOCUMENTS

| | | |
|---|---|---|
| CN | 101047866 A | 10/2007 |
| CN | 103514585 A | 1/2014 |
| CN | 104732911 A | 6/2015 |
| JP | S63282883 A | 11/1968 |
| JP | 2004272516 A | 9/2004 |
| JP | 2005524154 A | 8/2005 |
| JP | 2008033489 A | 2/2008 |
| JP | 2010191771 A | 9/2010 |
| WO | 9924964 A1 | 5/1999 |

OTHER PUBLICATIONS

First Office Action for Japanese Application No. 2016-565348, dated Oct. 29, 2017, 6 Pages.

\* cited by examiner

DISPLAY DRIVING METHOD, DRIVING CIRCUIT AND DISPLAY DEVICE

CROSS-REFERENCE TO RELATED APPLICATION

The present application is the U.S. national phase of PCT Application No. PCT/CN2015/088558 filed on Aug. 31, 2015, which claims a priority of Chinese patent application No. 201510166719.7 filed on Apr. 9, 2015, the disclosure of which is incorporated herein by reference in its entirety.

TECHNICAL FIELD

The present disclosure relates to a display device for colorblind people, and in particular to a method for driving a display, a driving circuit for executing the method for driving the display and a display device including the driving circuit.

BACKGROUND

Color blindness is a common disease of damaged color vision or no color vision, which is generally caused by genetic factors. The colorblind people may lack an ability to recognize some certain colors or cannot recognize any color at all. According to statistics, colorblind men accounted for about 8% of the total male population, while colorblind women accounted for about 0.5% of the total female population. The life and the work of the colorblind people may be severely affected by this disease.

There are three types of cone cells on a human retina. i.e. a L-cone cell being sensitive to the lights with long wavelengths of 535-575 nm, a M-cone cell being sensitive to the lights with medium wavelengths of 500-550 nm, and a S-cone cell being sensitive to the lights with short wavelengths of 400-450 nm. The color blindness is caused by absence or mutation of the cone cells on the retina. For example, the absence of the L-cone cell causes red two-color blindness, the absence of the M-cone cell causes green two-color blindness, and the absence of the S-cone cell causes blue two-color blindness. Both the red two-color blind people and the green two-color blind people cannot distinguish the red color from the green color, and the blue two-color blind people cannot distinguish the blue color from the green color.

Hans Brettel proposes a two-color blind simulation model, wherein all of the colors that can be observed by each of the red two-color blind people, the green two-color blind people and the blue two-color blind people are concentrated on two planes; however, an angle of such two planes is so small that the two planes is almost equal to one plane, which is called a color plane for the two-color blindness. As a result, a simplified two-color blind module is established.

As mentioned above, the two-color blindness is caused by the absence of one of the three types of cone cells, and such absence corresponds to variant of a particular signal and invariant of two other particular signals in a LMS space. Thus, the red two-color blindness, the green two-color blindness and the blue two-color blindness can be represented by projecting colors in the RGB space into respective planes in three directions of L, M and S. Researchers have found that the red two-color blind people and the green two-color blind people are incompetent in distinguish the red color from the green color, because the red color and the green color are distributed on two sides of the color plane for the red two-color blindness or the green two-color blindness respectively, and thus the red color and the green color may be overlapped with each thus and confused upon being projected onto the color plane. The blue two-color blind people are incompetent in distinguishing the blue color from the green color, because the blue color and the green color are distributed on two sides of the color plane for the blue two-color blindness.

In prior art, an image may be processed by rotating a H component of each sub-pixel; however, the image may be distorted by such processing.

SUMMARY

An object of the present disclosure is to provide a method for driving a display, a driving circuit for executing the method for driving the display and a display device including the driving circuit.

For achieving the above object, in one aspect, the present disclosure provides in some embodiments a method for driving a display including:

step 1, obtaining a tone of each sub-pixel in an input image;

step 2, determining whether a color of each sub-pixel to be calculated in the input image is capable of being distinguished from a reference color by a two-color blind viewer; and step 3, calculating the tone of each sub-pixel in an output image based on a result of the determination in step 2.

Alternatively, the step 3 further includes calculating the tone of the sub-pixel in the output image based on the following equation (1):

$$H_1 = H_0 + \Delta H \qquad (1);$$

wherein $H_0$ indicates the tone of the sub-pixel to be calculated in the input image;

$H_1$ indicates the tone of the sub-pixel in the output image, wherein a position of the sub-pixel in the output image corresponds to a position of the sub-pixel to be calculated in the input image;

when the color of the sub-pixel to be calculated is incapable of being distinguished from the reference color by the two-color blind viewer, $\Delta H \neq 0$, so that the color of the sub-pixel in the output image is converted to be capable of being distinguished from the reference color by the two-color blind viewer, wherein the position of the sub-pixel in the output image corresponds to the position of the sub-pixel to be calculated; and when the color of the sub-pixel to be calculated is capable of being distinguished from the reference color by the two-color blind viewer, $\Delta H = 0$.

Alternatively, the step 1 further includes obtaining a saturation of each sub-pixel in the input image;

The step 3 further includes calculating saturation of the sub-pixel in the output image based on the following equation (2):

$$S_1 = S_0 + \Delta S \qquad (2);$$

wherein $S_1$ indicates the saturation of the sub-pixel to be calculated in the output image;

$S_0$ indicates the saturation of the sub-pixel in the input image, wherein a position of the sub-pixel in the input image is same as a position of the sub-pixel to be calculated;

when the color of the sub-pixel to be calculated is incapable of being distinguished from the reference color by the two-color blind viewer, $\Delta S \neq 0$; and when the color of the sub-pixel to be calculated is capable of being distinguished from the reference color by the two-color blind viewer, $\Delta S = 0$.

Alternatively, $|\Delta S| \leq 0.45$.

Alternatively, in the step 2, when the tone of the sub-pixel to be calculated in the input image is within a first range or a second range, it is determined that the color of the sub-pixel to be calculated is incapable of being distinguished from the reference color, wherein the first range is [315°, 360°], the second range is [0°, 45°], and when $H_0$ is within the first range or the second range, in the step 3, $-40°\leq\Delta H\leq-1°$, and $-1<\Delta S<0$.

Alternatively, when $15°<H_0\leq45°$, in the step 3, $-39°\leq\Delta H\leq-1°$, $-0.099\leq\Delta S\leq-0.001$, and the more $H_0$ is, the more $\Delta H$ is, and the more $H_0$ is, the more $\Delta S$ is;

when $315\leq H_0<345°$, in the step 3, $-39°\leq\Delta H\leq-1°$, $-0.099\leq\Delta S\leq-0.001$, and the more $H_0$ is, the less $\Delta H$ is, and the more $H_0$ is, the less $\Delta S$ is;

when $345°\leq H_0\leq360°$ or when $0°\leq H_0\leq15°$, in the step 3, $\Delta H=-40°$ and $\Delta S=-0.1$.

Alternatively, in the step 2, when the tone of the sub-pixel to be calculated in the input image is within a third range, it is determined that the color of the sub-pixel to be calculated is incapable of being distinguished from the reference color, wherein the third range is [75°, 165°], and when $H_0$ is within the third range, in the step 3, $1°\leq\Delta H\leq40°$, and $0<\Delta S<1$.

Alternatively, when $75°\leq H_0<105°$, in the step 3, $1°\leq\Delta H\leq39°$, $0.001\leq\Delta S\leq0.099$, and the more $H_0$ is, the more $\Delta H$ is, and the more $H_0$ is, the more $\Delta S$ is;

when $105°\leq H_0\leq135°$, in the step 3, $\Delta H=40°$ and $\Delta S=0.1$; and when $135°<H_0\leq165°$, in the step 3, $1°\leq\Delta H\leq39°$, $0.001\leq\Delta S\leq0.099$, and the more $H_0$ is, the less $\Delta H$ is, and the more $H_0$ is, the less $\Delta S$ is.

Alternatively, a brightness of each sub-pixel in the output image is equivalent to a brightness of a corresponding sub-pixel in the input image.

Alternatively, the method further includes following steps executed between the step 1 and the step 2:

determining whether a calculation start signal being received:

upon receiving the calculation start signal, executing the step 2, and displaying the output image based on a result of the calculation in the step 3; and upon not receiving the calculation start signal, directly output the input image.

In another aspect, the present disclosure provides in some embodiments a driving circuit for a display device, wherein the driving circuit includes:

an input signal obtaining module, configured to obtain a tone of each sub-pixel in an input image;

a color determining module, configured to determine whether a color of each sub-pixel to be calculated in the input image is capable of being distinguished from a reference color by a two-color blind viewer; and an output signal calculating module, configured to be connected to the color determining module, and calculate the tone of each sub-pixel in an output image based on a result of determining by the color determining module.

Alternatively, the output signal calculating module is further configured to calculate the tone of the sub-pixel in the output image based on the following equation (1):

$$H_1 = H_0 + \Delta H \quad (1)$$

wherein $H_0$ indicates the tone of the sub-pixel to be calculated in the input image;

$H_1$ indicates the tone of the sub-pixel in the output image, wherein a position of the sub-pixel in the output image corresponds to a position of the sub-pixel to be calculated in the input image;

when the color of the sub-pixel to be calculated is incapable of being distinguished from the reference color by the two-color blind viewer, $\Delta H \neq 0$, so that the color of the sub-pixel in the output image is converted to be capable of being distinguished from the reference color by the two-color blind viewer, wherein the position of the sub-pixel in the output image corresponds to the position of the sub-pixel to be calculated; and when the color of the sub-pixel to be calculated is capable of being distinguished from the reference color by the two-color blind viewer, $\Delta H=0$.

Alternatively, the input signal obtaining module is further configured to obtain a saturation of each sub-pixel in the input image, and the output signal calculating module is further configured to calculate a saturation of each sub-pixel in the output image based on the following equation (2):

$$S_1 = S_0 + \Delta S \quad (2);$$

wherein $S_1$ indicates the saturation of the sub-pixel to be calculated in the output image;

$S_0$ indicates the saturation of the sub-pixel in the input image, wherein a position of the sub-pixel in the input image is same as a position of the sub-pixel to be calculated;

when the color of the sub-pixel to be calculated is incapable of being distinguished from the reference color by the two-color blind viewer, $\Delta S \neq 0$; and when the color of the sub-pixel to be calculated is capable of being distinguished from the reference color by the two-color blind viewer, $\Delta S=0$.

Alternatively, $|\Delta S|\leq0.45$.

Alternatively, when $H_0$ is within a first range or a second range, the color determining module determines that the color of the sub-pixel to be calculated is incapable of being distinguished from the reference color, $-40°\leq\Delta H\leq-1°$, and $-1<\Delta S<0$, wherein the first range is [315°, 360°], the second range is [0°, 45°], and the first range and the second range are stored in the color determining module.

Alternatively, when $15°<H_0\leq45$, $-39\leq\Delta H\leq-1$, $-0.099\leq\Delta S\leq-0.001$, and the more $H_0$ is, the more $\Delta H$ is, and the more $H_0$ is, the more $\Delta S$ is;

when $315°\leq H_0<345°$, $-39°\leq\Delta H\leq-1°$, $-0.099\leq\Delta S\leq-0.001$, and the more $H_0$ is, the less $\Delta H$ is, and the more $H_0$ is, the less $\Delta S$ is; and when $345°\leq H_0\leq360°$ or when $0°\leq H_0\leq15°$, $\Delta H=-40$ and $\Delta S=-0.1$.

Alternatively, when the tone of the sub-pixel to be calculated in the input image is within a third range, the color determining module determines that the color of the sub-pixel to be calculated is incapable of being distinguished from the reference color, wherein the third range is [75°, 165°], when $H_0$ is within the third range, $1°\leq\Delta H\leq40°$, and $0<\Delta S<1$, and the third range is stored in the color determining module.

Alternatively, when $75°\leq H_0<105°$, $1°\leq\Delta H\leq39°$, $0.001\leq\Delta S\leq0.099$, and the more $H_0$ is, the more $\Delta H$ is, and the more $H_0$ is, the more $\Delta S$ is;

when $105°\leq H_0\leq135°$, $\Delta H=40°$, and $\Delta S=0.1$;

when $135°<H\leq165°$, $1\leq\Delta H\leq39°$, $0.001\leq\Delta S\leq0.099$, and the more $H_0$ is, the less $\Delta H$ is, and the more $H_0$ is, the less $\Delta S$ is.

Alternatively, the output signal calculating module is configured to adjust a brightness of each sub-pixel in the output image, so that the brightness of the sub-pixel in the output image is equivalent to a brightness of a corresponding sub-pixel in the input image.

Alternatively, the display device further includes a trigger module and a control module, wherein the trigger module is connected to the control module, so that the trigger module is capable of transmitting a trigger signal to the control module, and the control module is further connected to the output signal calculating module, so that the control module is capable of transmitting a calculation start signal to the output signal calculating module upon receiving the trigger signal, and the output signal calculating module is capable of starting to calculate upon receiving the calculation start signal.

Alternatively, the control module is capable of controlling the driving circuit to directly output the output image upon not receiving the trigger signal.

In yet another aspect, the present disclosure provides in some embodiments a display device including the above driving circuit and a display panel, wherein an output of the driving circuit is connected to an input of the display panel.

In the method according to the present disclosure, it is merely adjusted the color that is incapable of being distinguished from the reference color by the two-color blind viewer instead of additionally adjusting the color that is capable of being distinguished from the reference color by the two-color blind viewer, so that a fidelity of the output image is maximally maintained, and a computational complexity for adjusting the color of the sub-pixel is reduced.

BRIEF DESCRIPTION OF THE DRAWINGS

Drawings as a portion of the present disclosure are provided to further illustrate the technical solutions of the present disclosure in association with the embodiments, and the present disclosure is not limited by these drawings. In the drawings.

DETAILED DESCRIPTION

The present disclosure will be described hereinafter in conjunction with the drawings and embodiments. It is appreciated that the specific embodiments described herein are merely adopted to illustrate and explain the present disclosure instead of limiting the scope of the disclosure.

Figure 1:
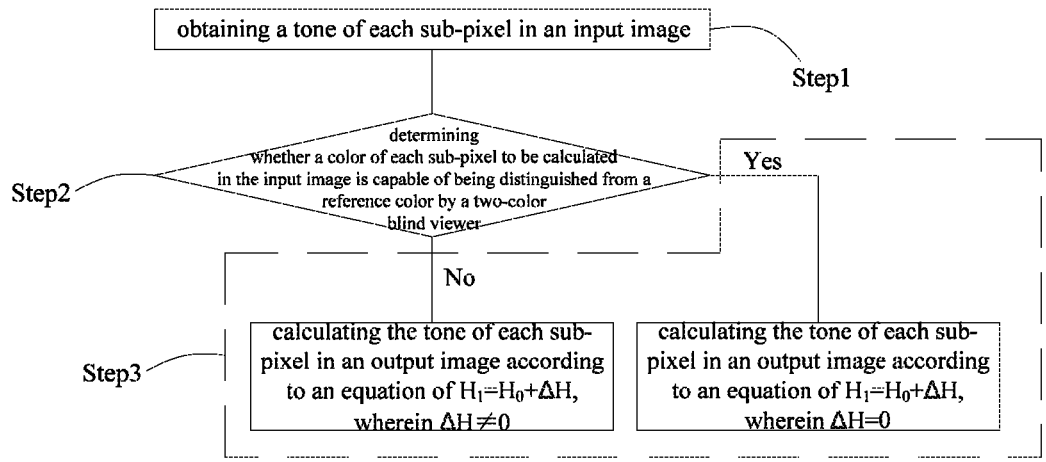
FIG. 1 is a flow chart of a method for driving a display according to an embodiment of the present disclosure.

As illustrated in FIG. 1, in one aspect, the present disclosure provides in some embodiments a method for driving a display including:

step 1, obtaining a tone of each sub-pixel in an input image:

step 2, determining whether a color of each sub-pixel to be calculated in the input image is capable of being distinguished from a reference color by a two-color blind viewer; and step 3, calculating the tone of each sub-pixel in an output image based on a result of the determination in step 2.

The step 3 further includes calculating the tone of the sub-pixel in the output image based on the following equation (1):

$$H_1 = H_0 + \Delta H \quad (1)$$

wherein $H_0$ indicates the tone of the sub-pixel to be calculated in the input image;

$H_1$ indicates the tone of the sub-pixel in the output image, wherein a position of the sub-pixel in the output image corresponds to a position of the sub-pixel to be calculated in the input image;

when the color of the sub-pixel to be calculated is incapable of being distinguished from the reference color by the two-color blind viewer, $\Delta H \neq 0$, so that the color of the sub-pixel in the output image is converted to be capable of being distinguished from the reference color by the two-color blind viewer, wherein the position of the sub-pixel in the output image corresponds to the position of the sub-pixel to be calculated; and when the color of the sub-pixel to be calculated is capable of being distinguished from the reference color by the two-color blind viewer, $\Delta H = 0$.

In the present disclosure, the reference color is one of the two colors that cannot be distinguished from each other by the two-color blind viewer. For example, when the color of the sub-pixel to be calculated is red, the reference color is green; when the color of the sub-pixel to be calculated is green, the reference color is red; and when the color of the sub-pixel to be calculated is blue, the reference color is green.

It is appreciated that a viewer skilled in the art may understand how to determine whether the color of the sub-pixel to be calculated in the input image is capable of being distinguished from the reference color by the two-color blind viewer. For example, in a paper titled "Computerized simulation of color appearance for dichormats" by Brettel H et al. in 1997, it is disclosed a two-color blind simulation model, wherein the color that is incapable of being distinguished from the reference color by each type of two-color blind viewer can be obtained by the above two-color blind simulation model. Alternatively, a viewer skilled in the art may determine the color that is incapable of being distinguished from the reference color by the two-color blind viewer according to other two-color blind simulation models.

After the calculation, the color of each sub-pixel in the output image is capable of being distinguished from the reference color, so that a two-color blind viewer may appropriately recognize the image (i.e. the output image) displayed by the display device which is driven by the method according to the present disclosure.

In the present disclosure, a value of $\Delta H$ may be determined based on the particular two-color blind simulation model. For example, by utilizing the above two-color blind simulation model proposed by Brettel H et al., the projection of the color of each sub-pixel in the output image on the color plane for the two-color blindness is not overlapped with the projection of the corresponding reference color on the color plane for the two-color blindness, and there is a distance between these two projections, so that the two-color blind viewer may distinguish the color of the sub-pixel in the output image from the reference color.

It can be seen from above that, in the method according to the present disclosure, it is merely adjusted the color that is incapable of being distinguished from the reference color by the two-color blind viewer instead of additionally adjusting the color that is capable of being distinguished from the reference color by the two-color blind viewer, so that a fidelity of the output image is maximally maintained, and a computational complexity for adjusting the color of the sub-pixel is reduced.

Alternatively, the step 3 further includes calculating saturation of the sub-pixel in the output image based on the following equation (2): The step 3 further includes calculating saturation of the sub-pixel in the output image based on the following equation (2):

$$S_1 = S_0 + \Delta S \quad (2):$$

wherein $S_1$ indicates the saturation of the sub-pixel to be calculated in the output image:

$S_0$ indicates the saturation of the sub-pixel in the input image, wherein a position of the sub-pixel in the input image is same as a position of the sub-pixel to be calculated;

when the color of the sub-pixel to be calculated is incapable of being distinguished from the reference color by the two-color blind viewer, $\Delta S \neq 0$; and when the color of the sub-pixel to be calculated is capable of being distinguished from the reference color by the two-color blind viewer, $\Delta S=0$.

The contrast of the color that is incapable of being distinguished by the two-color blind viewer in the input image can be further increased by adjusting the saturation of the sub-pixel in the input image, so that the two-color blind viewer may observe the output image that is closer to the input image.

The saturation of the sub-pixel in the input image may be adjusted based on the color recognizing ability of the colorblind viewer. Alternatively, the saturation may be adjusted by a unit of no more than 0.45, i.e. $|\Delta S| \leq 0.45$.

For reducing the steps of calculation, the predetermined "color incapable of being distinguished by the two-color blind viewer" may be inputted into the driving circuit for executing the driving method.

For example, for the red two-color blind viewer incapable of distinguishing the red color from the green color, the color may be defined to be red when $H_0$ is within the first range or within the second range, wherein the first range is [315°, 360°], and the second range is [10°, 45°]. Thus, in the step 2, when the tone of the sub-pixel to be calculated in the input image is within the first range or the second range, it is determined that the color of the sub-pixel to be calculated is incapable of being distinguished from the reference color (green color). When the tone $H_0$ of the sub-pixel to be calculated in the input image is within the first range or the second range, in the step 3, $-40° \leq \Delta H \leq -1°$ and $-1 < \Delta S < 0$.

Alternatively, in order to make the figure in the output image to be as same as possible to the figure in the input image, when $15° < H_0 \leq 45°$, in the step 3, $-39° \leq \Delta H \leq -1°$, $-0.099 \leq \Delta S \leq -0.001$, and the more $H_0$ is, the more $\Delta H$ is, and the more $H_0$ is, the more $\Delta S$ is;

when $315° \leq H_0 < 345°$, in the step 3, $-39° \leq \Delta H \leq -1°$, $-0.099 \leq \Delta S \leq -0.001$, and the more $H_0$ is, the less $\Delta H$ is, and the more $H_0$ is, the less $\Delta S$ is;

when $345° \leq H_0 \leq 360°$ or when $0° \leq H_0 \leq 15°$, in the step 3, $\Delta H = -40°$ and $\Delta S = -0.1$.

It is noted the feature that "when $15° < H_0 \leq 45°$, $-39° \leq \Delta H \leq -1°$, $-0.099 \leq \Delta S \leq -0.001$, and the more $H_0$ is, the more $\Delta H$ is, and the more $H_0$ is, the more $\Delta S$ is" indicates that, if the tone $H_0$ of a first sub-pixel to be calculated is greater than the tone $H_0$ of a second sub-pixel to be calculated, the $\Delta H$ adopted for the calculation of the tone of the first sub-pixel to be calculated is greater than the $\Delta H$ adopted for the calculation the tone of the second sub-pixel to be calculated, and similarly, the $\Delta S$ adopted for the calculation of the tone of the first sub-pixel to be calculated is greater than the $\Delta S$ adopted for the calculation of the tone of the second sub-pixel to be calculated.

Similarly, the feature that "when $315° \leq H_0 < 345°$, $-39° \leq \Delta H \leq -1°$, $-0.099 \leq \Delta S \leq -0.001$, and the more $H_0$ is, the less $\Delta H$ is, and the more $H_0$ is, the less $\Delta S$ is" indicates that, if the tone $H_0$ of a first sub-pixel to be calculated is greater than the tone $H_0$ of a second sub-pixel to be calculated, the $\Delta H$ adopted for the calculation of the tone of the first sub-pixel to be calculated is less than the $\Delta H$ adopted for the calculation the tone of the second sub-pixel to be calculated, and similarly, the $\Delta S$ adopted for the calculation of the tone of the first sub-pixel to be calculated is less than the $\Delta S$ adopted for the calculation of the tone of the second sub-pixel to be calculated.

For the green two-color blind viewer incapable of distinguishing the green color from the red color, when the tone is within the third range, it is determined that the color of the sub-pixel to be calculated is incapable of being distinguished from the reference color (red color), wherein the third range is [75°, 165°]. When $H_0$ is within the third range, $1° \leq \Delta H \leq 40°$ and $0 < \Delta S < 1$.

Alternatively, when $75° \leq H_0 < 105°$, in the step 3, $1° \leq \Delta H \leq 39°$ $0.001 \leq \Delta S \leq 0.099$, and the more $H_0$ is, the more $\Delta H$ is, and the more $H_0$ is, the more $\Delta S$ is;

when $105° \leq H_0 \leq 135°$, in the step 3, $\Delta H = 40°$ and $\Delta S = 0.1$; and when $135° < H_0 \leq 165°$, in the step 3, $1° \leq \Delta H \leq 39°$, $0.001 \leq \Delta S \leq 0.099$, and the more $H_0$ is, the less $\Delta H$ is, and the more $H_0$ is, the less $\Delta S$ is.

It is noted the feature that "the more $H_0$ is, the more $\Delta H$ is, and the more $H_0$ is, the more $\Delta S$ is" indicates that, if the tone $H_0$ of a first sub-pixel to be calculated is greater than the tone $H_0$ of a second sub-pixel to be calculated, the $\Delta H$ adopted for the calculation of the tone of the first sub-pixel to be calculated is greater than the $\Delta H$ adopted for the calculation the tone of the second sub-pixel to be calculated, and similarly, the $\Delta S$ adopted for the calculation of the tone of the first sub-pixel to be calculated is greater than the $\Delta S$ adopted for the calculation of the tone of the second sub-pixel to be calculated.

Similarly, the feature that "the more $H_0$ is, the less $\Delta H$ is, and the more $H_0$ is, the less $\Delta S$ is" indicates that, if the tone $H_0$ of a first sub-pixel to be calculated is greater than the tone $H_0$ of a second sub-pixel to be calculated, the $\Delta H$ adopted for the calculation of the tone of the first sub-pixel to be calculated is less than the $\Delta H$ adopted for the calculation the tone of the second sub-pixel to be calculated, and similarly, the $\Delta S$ adopted for the calculation of the tone of the first sub-pixel to be calculated is less than the $\Delta S$ adopted for the calculation of the tone of the second sub-pixel to be calculated.

In the present disclosure, for reducing the computational complexity, it is not required to adjust the brightness of each sub-pixel in the input image, i.e. the brightness of each sub-pixel in the output image is same as the brightness of the corresponding sub-pixel in the input image.

Alternatively, for improving the applicability of the display device, the color of the sub-pixel in the input image may be adjusted when a image viewer is a colorblind viewer, and the color of the sub-pixel in the input image is not required to be adjusted when the image viewer has no color vision disorders.

Accordingly, the method further includes following steps executed between the step 1 and the step 2:

determining whether a calculation start signal being received;

upon receiving the calculation start signal, executing the step 2, and displaying the output image based on a result of the calculation in the step 2; and upon not receiving the calculation start signal, directly output the input image.

The calculation start signal may be provided by the viewer manually, which will be explained later in further details.

Figure 2:
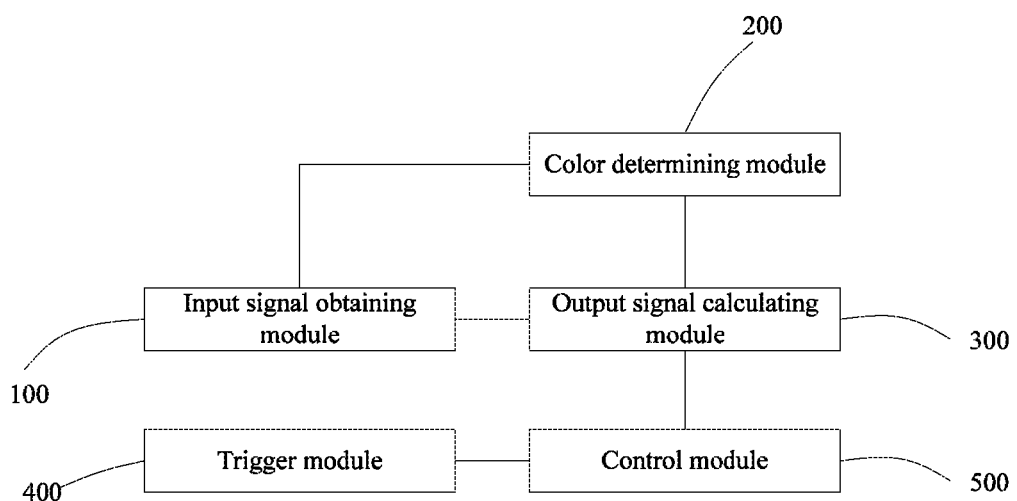
FIG. 2 is a block diagram of a driving circuit according to an embodiment of the present disclosure.

As illustrated in FIG. 2, in another aspect, the present disclosure provides in some embodiments a driving circuit for a display device, wherein the driving circuit is configured to execute the above driving method and include:

an input signal obtaining module 100, configured to obtain a tone of each sub-pixel in an input image;

a color determining module 200, configured to determine whether a color of each sub-pixel to be calculated in the input image is capable of being distinguished from a reference color by a two-color blind viewer; and an output signal calculating module 300, configured to be connected to the color determining module 200, and calculate the tone of each sub-pixel in an output image based on a result determined by the color determining module 200.

The output signal calculating module 300 is further configured to calculate the tone of the sub-pixel in the output image based on the following equation (1):

$$H_1 = H_0 + \Delta H \quad (1);$$

wherein $H_0$ indicates the tone of the sub-pixel to be calculated in the input image;

$H_1$ indicates the tone of the sub-pixel in the output image, wherein a position of the sub-pixel in the output image corresponds to a position of the sub-pixel to be calculated in the input image;

when the color of the sub-pixel to be calculated is incapable of being distinguished from the reference color by the two-color blind viewer, $\Delta H \neq 0$, so that the color of the sub-pixel in the output image is converted to be capable of being distinguished from the reference color by the two-color blind viewer, wherein the position of the sub-pixel in the output image corresponds to the position of the sub-pixel to be calculated; and when the color of the sub-pixel to be calculated is capable of being distinguished from the reference color by the two-color blind viewer, $\Delta H = 0$.

In the driving circuit according to the present disclosure, the two-color simulation model is stored in the color determining module 200, and the color of each sub-pixel in the input image is input into the two-color blind simulation model, so that it may be determined whether the color of each sub-pixel in the input image is capable of being distinguished from the reference color by the two-color blind viewer.

The input signal calculating module 300 may include an adder for the calculation of the equation (1).

In this embodiment, the driving circuit may execute the above driving method, so as to convert the input image into the output image that can be appropriately recognized by the two-color blind viewer. Furthermore, the output signal calculating module 300 merely adjusts the color that is incapable of being distinguished from the reference color by the two-color blind viewer instead of additionally adjusting the color that is capable of being distinguished from the reference color by the two-color blind viewer, so that a fidelity of the original image is maximally maintained, and the computational complexity is reduced.

Alternatively, the input signal obtaining module 100 is further configured to obtain a saturation of each sub-pixel in the input image, and the output signal calculating module is further configured to calculate a saturation of each sub-pixel in the output image based on the following equation (2):

$$S_1 = S_0 + \Delta S \quad (2);$$

wherein $S_1$ indicates the saturation of the sub-pixel to be calculated in the output image;

$S_0$ indicates the saturation of the sub-pixel in the input image, wherein a position of the sub-pixel in the input image is same as a position of the sub-pixel to be calculated;

when the color of the sub-pixel to be calculated is incapable of being distinguished from the reference color by the two-color blind viewer, $\Delta S \neq 0$; and when the color of the sub-pixel to be calculated is capable of being distinguished from the reference color by the two-color blind viewer, $\Delta S = 0$.

As illustrated above, the contrast of the color that is incapable of being distinguished by the two-color blind viewer in the input image can be further increased by adjusting the saturation, so that the two-color blind viewer may observe the output image that is closer to the input image. Alternatively, $|\Delta S| \leq 0.45$.

In an embodiment, the driving circuit is adapted for the display for the red two-color blind viewer incapable of distinguishing the color (i.e. the red color) with the tone being within the first range or the second range from the green color. As a result, alternatively, when $H_0$ is within the first range or the second range, $-40° \leq \Delta H \leq -1°$ and $-1 < \Delta S < 0$, wherein the first range is $[315°, 360°]$, and the second range is $[0°, 45°]$. The first range and the second range may be stored in the color determining module 200.

Alternatively, for further maintaining the fidelity of the display image, when $15° < H_0 \leq 45°$, $-39° \leq \Delta H \leq -1°$, $-0.099 \leq \Delta S \leq -0.001$, and the more $H_0$ is, the more $\Delta H$ is, and the more $H_0$ is, the more $\Delta S$ is;

when $315° \leq H_0 < 345°$, $-39° \leq \Delta H \leq -1°$, $-0.099 \leq \Delta S \leq -0.001$, and the more $H_0$ is, the less $\Delta H$ is, and the more $H_0$ is, the less $\Delta S$ is:

when $345° \leq H_0 \leq 360°$ or when $0° \leq H_0 \leq 15°$, $\Delta H = -40°$ and $\Delta S = -0.1$.

In an embodiment, the driving circuit is adapted for the display for the green two-color blind viewer incapable of distinguishing the color (i.e. the green color) with the tone being within the third range from the red color. As a result, alternatively, when the tone of the sub-pixel to be calculated in the input image is within a third range, it is determined that the color of the sub-pixel to be calculated is incapable of being distinguished from the reference color, wherein the third range is $[75°, 165°]$, when $H_0$ is within the third range, $1° \leq \Delta H \leq 40°$, and $0 < \Delta S < 1$. The third range may be stored in the color determining module 200.

Alternatively, for further maintaining the fidelity of the image, when $75° \leq H_0 < 105°$, $1° \leq \Delta H \leq 39°$, $0.001 \leq \Delta S \leq 0.099$, and the more $H_0$ is, the more $\Delta H$ is, and the more $H_0$ is, the more $\Delta S$ is:

when $105° \leq H_0 \leq 135°$, $\Delta H = 40°$, and $\Delta S = 0.1$;

when $135° < H_0 \leq 165°$, $1° \leq \Delta H \leq 39°$, $0.001 \leq \Delta S \leq 0.099$, and the more $H_0$ is, the less $\Delta H$ is, and the more $H_0$ is, the less $\Delta S$ is;

Alternatively, for reducing the computational complexity, a brightness of each sub-pixel in the output image is equivalent to a brightness of a corresponding sub-pixel in the input image.

Alternatively, for improving the applicability of the display device, the color of the sub-pixel in the input image may be adjusted when a image viewer is a colorblind viewer, and the color of the sub-pixel in the input image is not required to be adjusted when the image viewer has no color vision disorders. For achieving the above object, the display device further includes a trigger module 400 and a control module 500, wherein the trigger module 400X) is capable of transmitting a trigger signal to the control module 500, and the control module 500 is capable of transmitting a calculation start signal to the output signal calculating module 300 upon receiving the trigger signal, and the output signal calculating module 300 is capable of starting to calculate upon receiving the calculation start signal (i.e. executing the calculation of the equation (1) and/or the equation (2)).

Alternatively, the control module 500 is capable of controlling the driving circuit to directly output the output image upon not receiving the trigger signal.

In yet another aspect, the present disclosure provides in some embodiments a display device including the above driving circuit and a display panel, wherein an output of the driving circuit is connected to an input of the display panel.

The display device is applicable for the two-color blind viewer to view the display image while maximally maintaining the fidelity of the image and significantly reducing the computational complexity.

It is appreciated that the above are merely the preferred embodiments of the present disclosure for illustrating the principle of the present disclosure, and the present disclosure is not limited thereto. A viewer skilled in the art may make further modifications and improvements without departing from the principle and the spirit of the present disclosure, and these modifications and improvements shall also fall within the scope of the present disclosure.

What is claimed is:

1. A method for driving a display, comprising:
   step 1, obtaining a tone of each sub-pixel in an input image;
   step 2, determining whether a color of each sub-pixel to be calculated in the input image is capable of being distinguished from a reference color by a two-color blind viewer, wherein the reference color is one of two colors incapable of being distinguished by the two-color blind viewer;
   step 3, calculating the tone of each sub-pixel in an output image based on a result of the determination in the step 2, and
   step 4, displaying the output image on the display for the two-color blind viewer to view,
   wherein the step 3 comprises:
      in response to a positive determination in the step 2, taking the tone of the input image as the tone of the output image; and
      in response to a negative determination in the step 2, adding a tone difference to the tone of the input image to obtain the tone of each sub-pixel in the output image.

2. The method according to claim 1, wherein the step 3 further comprises:
   calculating the tone of the sub-pixel in the output image based on the following equation (1):
   $$H_1 = H_0 + \Delta H \quad (1),$$
   wherein $H_0$ indicates the tone of the sub-pixel to be calculated in the input image;
   $H_1$ indicates the tone of the sub-pixel in the output image, wherein a position of the sub-pixel in the output image corresponds to a position of the sub-pixel to be calculated in the input image;
   when the color of the sub-pixel to be calculated is incapable of being distinguished from the reference color by the two-color blind viewer, $\Delta H \neq 0$, and $\Delta H$ is the tone difference calculated based on a two-color blind simulation model, so that the color of the sub-pixel in the output image is converted to be capable of being distinguished from the reference color by the two-color blind viewer, wherein the position of the sub-pixel in the output image corresponds to the position of the sub-pixel to be calculated; and
   when the color of the sub-pixel to be calculated is capable of being distinguished from the reference color by the two-color blind viewer, $\Delta H = 0$.

3. The method according to claim 1, wherein the step 1 further comprises obtaining a saturation of each sub-pixel in the input image;
   the step 3 further comprises:
   calculating a saturation of each sub-pixel in the output image based on the following equation (2):
   $$S_1 = S_0 + \Delta S \quad (2);$$
   wherein $S_1$ indicates the saturation of the sub-pixel to be calculated in the output image;
   $S_0$ indicates the saturation of the sub-pixel in the input image, wherein a position of the sub-pixel in the input image is same as a position of the sub-pixel to be calculated;
   when the color of the sub-pixel to be calculated is incapable of being distinguished from the reference color by the two-color blind viewer, $\Delta S \neq 0$; and
   when the color of the sub-pixel to be calculated is capable of being distinguished from the reference color by the two-color blind viewer, $\Delta S = 0$.

4. The method according to claim 3, wherein $|\Delta S| \leq 0.45$.

5. The method according to claim 4, wherein in the step 2, when the tone of the sub-pixel to be calculated in the input image is within a first range or a second range, it is determined that the color of the sub-pixel to be calculated is incapable of being distinguished from the reference color, wherein the first range is [315°, 360°], and the second range is [0°, 45°], and when $H_0$ is within the first range or the second range, in the step 3, $-40° \leq H \leq -1°$, and $-1 < \Delta S < 0$.

6. The method according to claim 5, wherein
   when $15° < H_0 \leq 45°$, in the step 3, $-39° \leq \Delta H \leq -1°$, $-0.099 \leq \Delta S \leq -0.001$, and the more $H_0$ is, the more $\Delta H$ is, and the more $H_0$ is, the more $\Delta S$ is;
   when $315° \leq H_0 < 345°$, in the step 3, $-39° \leq \Delta H \leq -1°$, $-0.099 \leq \Delta S \leq -0.001$, and the more $H_0$ is, the less $\Delta H$ is, and the more $H_0$ is, the less $\Delta S$ is; and
   when $345° \leq H_0 \leq 360°$ or when $0° \leq H_0 \leq 15°$, in the step 3, $\Delta H = -40°$ and $\Delta S = -0.1$.

7. The method according to claim 3, wherein the step 2 further comprises, when the tone of the sub-pixel to be calculated in the input image is within a third range, determining that the color of the sub-pixel to be calculated is incapable of being distinguished from the reference color, wherein the third range is [75°, 165°], when $H_0$ is within the third range, in the step 3, $1° \leq \Delta H \leq 40°$, and $0 < \Delta S < 1$.

8. The method according to claim 7, wherein
   when $75° \leq H_0 < 105°$, in the step 3, $1° \leq \Delta H \leq 39°$, $0.001 \leq \Delta S \leq 0.099$, and the more $H_0$ is, the more $\Delta H$ is, and the more $H_0$ is, the more $\Delta S$ is;
   when $105° \leq H_0 \leq 135°$, in the step 3, $\Delta H = 40°$, and $\Delta S = 0.1$;
   when $135° < H_0 \leq 165°$, in the step 3, $1° \leq \Delta H \leq 39°$, $0.001 \leq \Delta S \leq 0.099$, and the more $H_0$ is, the less $\Delta H$ is, and the more $H_0$ is, the less $\Delta S$ is.

9. The method according to claim 1, wherein a brightness of each sub-pixel in the output image is equivalent to a brightness of a corresponding sub-pixel in the input image.

10. The method according to claim 1, further comprising following steps between the step 1 and the step 2:
    determining whether a calculation start signal being received;
    in response to receiving the calculation start signal, going to the step 2; and
    in response to not receiving the calculation start signal, directly output the input image on the display.

11. A driving circuit for a display device, is configured to: obtain a tone of each sub-pixel in an input image; determine whether a color of each sub-pixel to be calculated in the input image is capable of being distinguished from a reference color by a two-color blind viewer, wherein the reference color is one of two colors incapable of being distinguished by the two-color blind viewer; calculate the tone of each sub-pixel in an output image based on a determination result; and display the output image on a display panel of the display device for the two-color blind viewer to view; wherein in calculating the tone of each sub-pixel in the output image based on the determination result, the driving circuit is further configured to: in response to a positive determination result, take the tone of the input image as the tone of the output image; and in response to a negative determination result, add a tone difference to the tone of the input image to obtain the tone of each sub-pixel in the output image.

12. The driving circuit according to claim 11, wherein the driving circuit is further configured to calculate the tone of the sub-pixel in the output image based on the following equation (1): H1=Ho+ΔH (1); wherein Ho indicates the tone of the sub-pixel to be calculated in the input image; H1 indicates the tone of the sub-pixel in the output image, wherein a position of the sub-pixel in the output image corresponds to a position of the sub-pixel to be calculated in the input image; when the color of the sub-pixel to be calculated is incapable of being distinguished from the reference color by the two-color blind viewer, ΔH≠O, and ΔH is the tone difference calculated based on a two-color blind simulation model, so that the color of the sub-pixel in the output image is converted to be capable of being distinguished from the reference color by the two-color blind viewer, wherein the position of the sub-pixel in the output image corresponds to the position of the sub-pixel to be calculated; and when the color of the sub-pixel to be calculated is capable of being distinguished from the reference color by the two-color blind viewer, ΔH=O.

13. The driving circuit according to claim 12, wherein |ΔS|≤0.45.

14. The driving circuit according to claim 11, wherein the driving circuit is further configured to obtain a saturation of each sub-pixel in the input image and calculate a saturation of each sub-pixel in the output image based on the following equation (2): Si=So+ΔS (2); wherein Si indicates the saturation of the sub-pixel to be calculated in the output image; So indicates the saturation of the sub-pixel in the input image, wherein a position of the sub-pixel in the input image is same as a position of the sub-pixel to be calculated; when the color of the sub-pixel to be calculated is incapable of being distinguished from the reference color by the two-color blind viewer, ΔS≠O; and when the color of the sub-pixel to be calculated is capable of being distinguished from the reference color by the two-color blind viewer, ΔS=O.

15. The driving circuit according to claim 14, wherein, when Ho is within a first range or a second range, the driving circuit determines that the color of the sub-pixel to be calculated is incapable of being distinguished from the reference color, −40°<ΔH<−1 and −1°<ΔS<0, wherein the first range is [315° 360°], the second range is [0°, 45°].

16. The driving circuit according to claim 15, wherein
when 15°<$H_0$≤45°, −39°<ΔH≤−1°, −0.099≤ΔS≤−0.001, and the more $H_0$ is, the more ΔH is, and the more $H_0$ is, the more ΔS is;
when 315°≤$H_0$<345°, −39°≤ΔH≤−1°, −0.099≤ΔS≤−0.001, and the more $H_0$ is, the less ΔH is, and the more $H_0$ is, the less ΔS is; and
when 345°≤$H_0$≤360° or when 0°≤$H_0$≤15°, ΔH=−40° and ΔS=−0.1.

17. The driving circuit according to claim 14, wherein, when the tone of the sub-pixel to be calculated in the input image is within a third range, the driving circuit determines that the color of the sub-pixel to be calculated is incapable of being distinguished from the reference color, wherein the third range is [75°, 165°], when Ho is within the third range, 1°<ΔH<40°, and 0<ΔS<1.

18. The driving circuit according to claim 17, wherein
when 75°≤$H_0$≤105°, 1°≤ΔH≤39°, 0.001≤ΔS≤0.099, and the more $H_0$ is, the more ΔH is, and the more $H_0$ is, the more ΔS is;
when 105°≤$H_0$≤135°, ΔH=40°, and ΔS=0.1;
when 135°<$H_0$≤165°, 1°≤ΔH≤39°, 0.001≤ΔS≤0.099, and the more $H_0$ is, the less ΔH is, and the more $H_0$ is, the less ΔS is.

19. The driving circuit according to claim 11, wherein the driving circuit is further configured to adjust a brightness of each sub-pixel in the output image, so that the brightness of the sub-pixel in the output image is equivalent to a brightness of a corresponding sub-pixel in the input image.

20. The driving circuit according to claim 11, wherein the driving circuit is further configured to: in response to receiving a calculation start signal, perform the step of calculating the tone of each sub-pixel in the output image based on the determination result; and in response to not receiving the calculation start signal, directly output the input image on a display panel of the display device.

21. A display device comprising a driving circuit according to claim 11 and a display panel, wherein an output of the driving circuit is connected to an input of the display panel.

* * * * *

UNITED STATES PATENT AND TRADEMARK OFFICE
CERTIFICATE OF CORRECTION

PATENT NO. : 9,916,786 B2
APPLICATION NO. : 14/913564
DATED : March 13, 2018
INVENTOR(S) : Ruisi Chen Page 1 of 1

It is certified that error appears in the above-identified patent and that said Letters Patent is hereby corrected as shown below:

In the Claims

Column 12, Line 45, Claim 7:
After "step 3,"
Delete "1" and
Insert -- 1° --.

Column 14, Line 8, Claim 15:
After "the reference color"
Delete "-40°< $\Delta H$<-1" and
Insert -- -40°< $\Delta H$<-1° --.

Signed and Sealed this
Nineteenth Day of June, 2018

Andrei Iancu
*Director of the United States Patent and Trademark Office*